United States Patent [19]

Cross et al.

[11] Patent Number: 5,186,438
[45] Date of Patent: Feb. 16, 1993

[54] MODULAR ROCK CATCHMENT BARRIER

[76] Inventors: Richard H. Cross, R.D. 1, Saddlemire Hill Rd., Sloansville, N.Y. 12160; Peter J. Smith, 157 Parkhurst Rd., Gansevoort, N.Y. 12831

[21] Appl. No.: 607,447

[22] Filed: Oct. 31, 1990

[51] Int. Cl.⁵ .......................... E01F 7/04; E04H 17/14
[52] U.S. Cl. .................................... 256/13.1; 256/12.5; 256/19; 256/24; 404/6; 52/169.2; 403/2; 403/294
[58] Field of Search ........................ 256/12.5, 13.1, 24, 256/19, 25, 73, 35, 36; 404/6, 9; 52/169.9, 169.2, 296; 403/2, 294; 405/284, 285, 262, 273

[56] References Cited

U.S. PATENT DOCUMENTS

| | | | |
|---|---|---|---|
| 1,012,868 | 12/1911 | Laney . | |
| 2,709,073 | 5/1955 | Dougherty . | |
| 2,805,046 | 9/1957 | Petterson | 256/25 |
| 2,813,197 | 11/1957 | Hubbard et al. . | |
| 3,388,892 | 6/1968 | Case | 256/13.1 |
| 3,630,474 | 12/1971 | Minor | 52/296 X |
| 3,877,236 | 4/1975 | O'Neill et al. | 405/273 |
| 4,335,868 | 6/1982 | Ribbert . | |
| 4,685,656 | 8/1987 | Lee et al. . | |
| 4,707,962 | 11/1987 | Meheen | 405/273 X |
| 4,730,810 | 3/1988 | Rambaud . | |
| 4,787,603 | 11/1988 | Norton | 256/25 |
| 4,923,319 | 3/1990 | Dent | 403/2 |
| 5,015,119 | 5/1991 | Schmanski | 256/13.1 X |
| 5,022,781 | 6/1991 | Smith | 256/13.1 X |

FOREIGN PATENT DOCUMENTS

| | | | |
|---|---|---|---|
| 2107233 | 8/1971 | Fed. Rep. of Germany | 256/12.5 |
| 3014523 | 10/1981 | Fed. Rep. of Germany | 250/19 |
| 1501586 | 11/1966 | France | 256/24 |
| 92939 | 9/1967 | France | 256/24 |

Primary Examiner—Peter M. Cuomo
Attorney, Agent, or Firm—Heslin & Rothenberg

[57] ABSTRACT

The subject invention provides a rock catchment barrier comprising a plurality of modules. Each module comprises a concrete base having a top surface, a post, a concrete barrier, an aperture for connecting the post to the top surface of the concrete base, a connector for connecting the concrete barrier to either side of the concrete base, and a fence panel for catching rocks, the fence panel being attachable to the post, wherein when the concrete base is connected to the concrete barrier, and the post is connected to the concrete base and the fence panel for catching rocks, a resulting module is formed. The rock catchment barrier provides protection for use in a rock excavation or scaling site where there is a need to stop rocks which are projected away from the site, such as when the rock excavation or scaling site is adjacent to a flow to traffic.

37 Claims, 8 Drawing Sheets

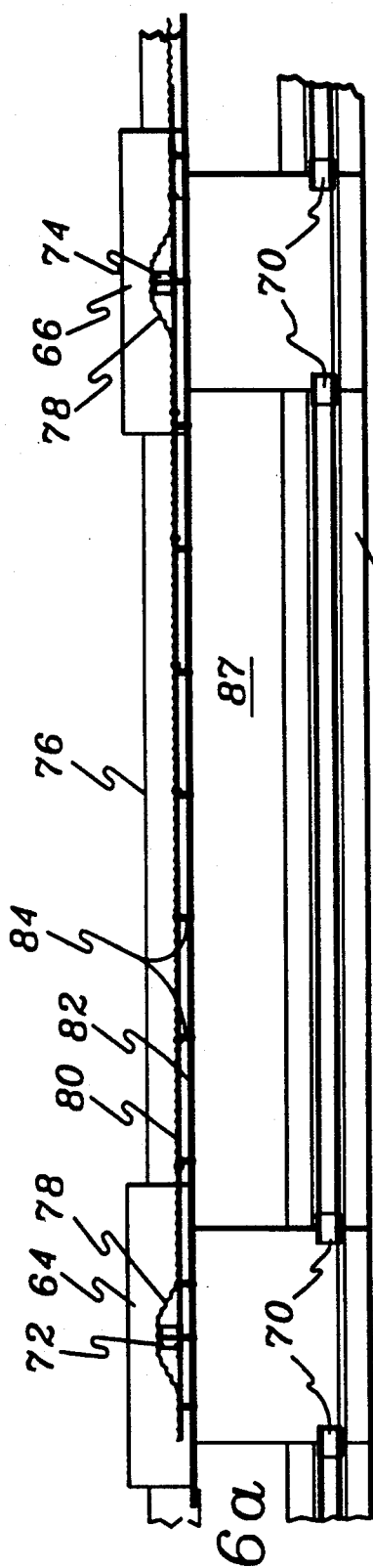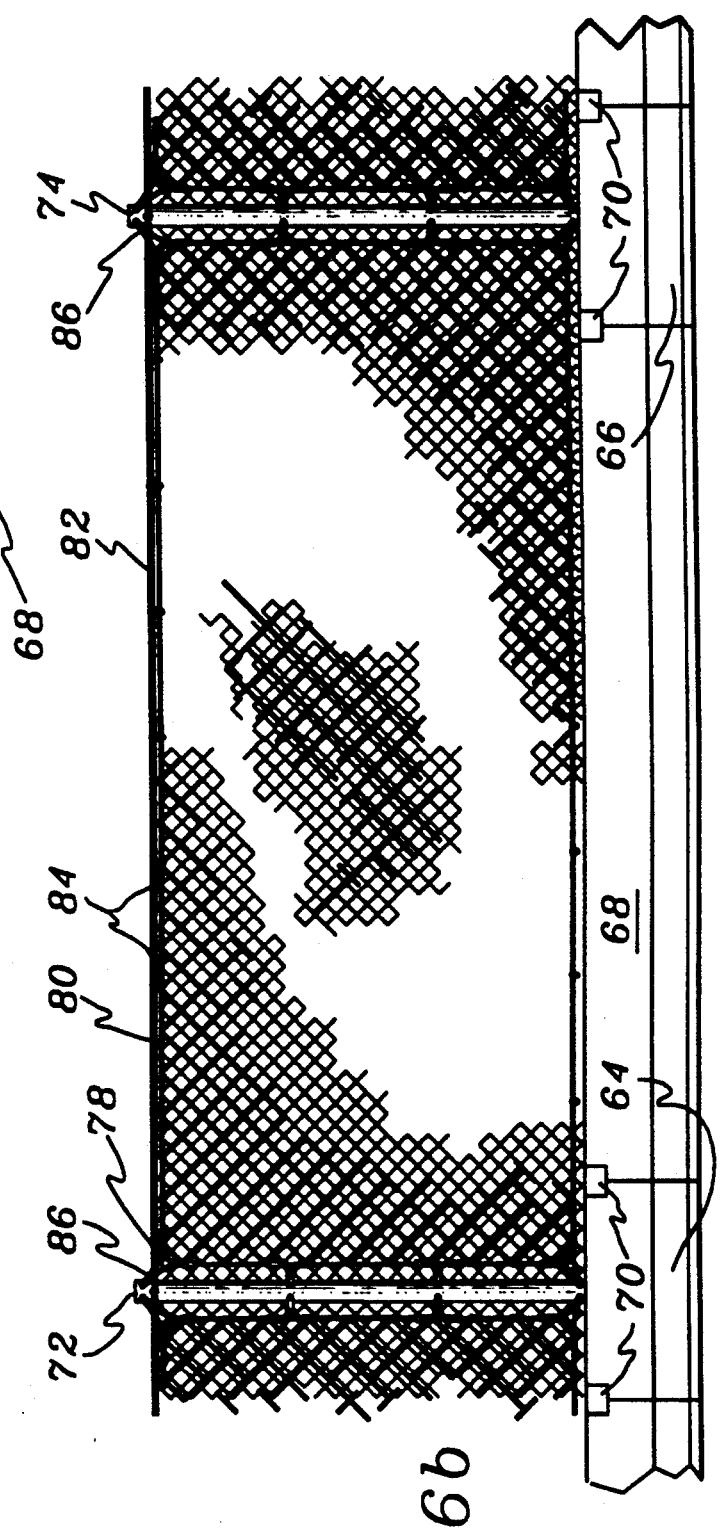

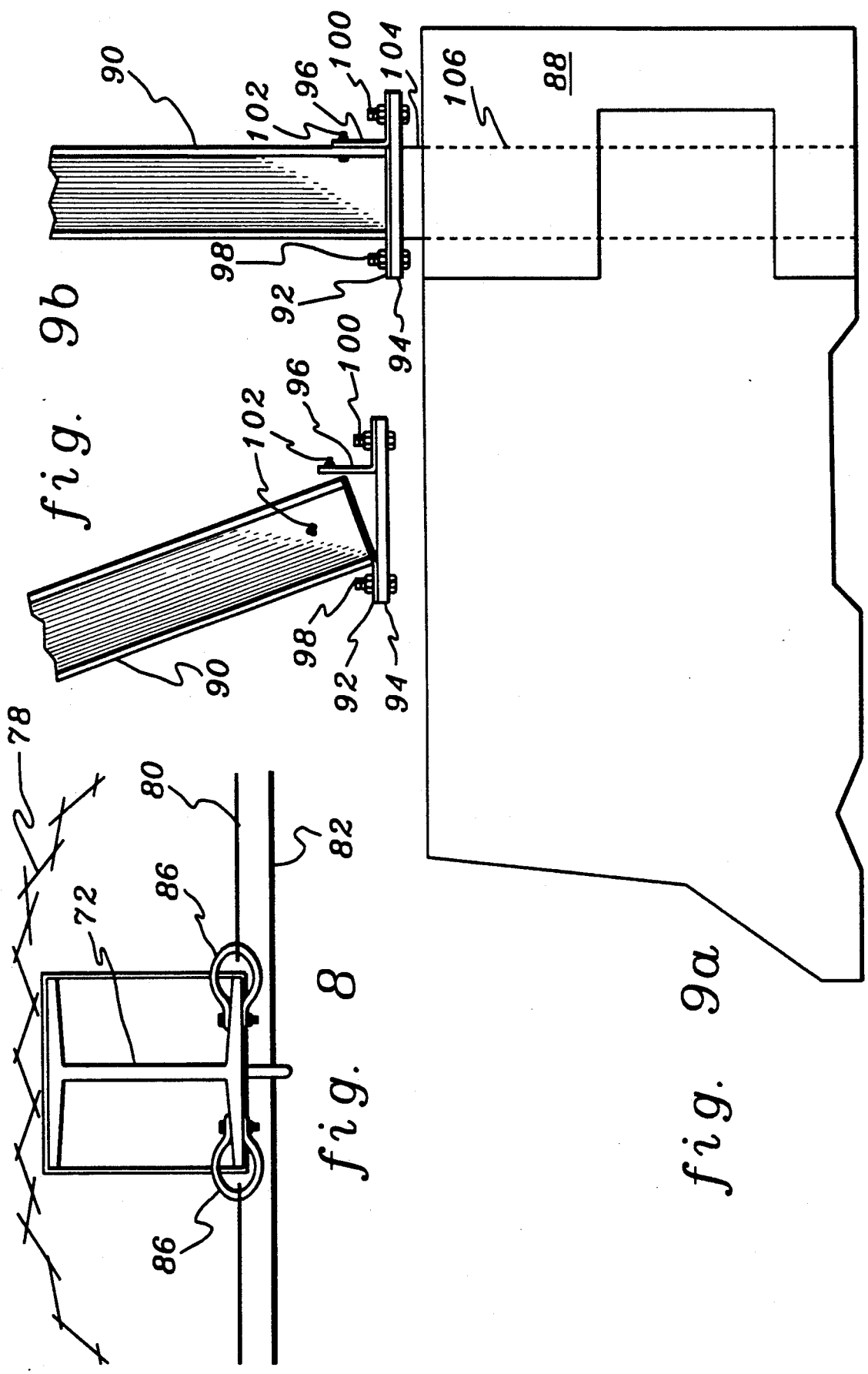

MODULAR ROCK CATCHMENT BARRIER

FIELD OF THE INVENTION

The subject invention relates to a modular rock fall protection device for use in a rock excavation or scaling site where there is a need to stop any rocks which are projected away from the site, such as when the rock excavation or scaling site is adjacent to a flow of traffic. The subject invention can also be used as a semi-permanent or permanent modular rock fall protection device where there is a need to protect an area from rocks falling from a rock face, where no rock excavation or scaling is occurring.

BACKGROUND OF THE INVENTION

Rock excavation or scaling projects are often performed near a flow of traffic, for example, on a highway. Normally, these activities require that traffic be stopped in order to safely proceed with the work. Another alternative is to detour the traffic around the site of the rock excavation or scaling.

The subject invention provides a modular rock fall protection device, a modular rock catchment barrier, which permits all the normal range of construction activities found on a rock excavation or scaling site to be carried on virtually unrestricted directly adjacent to traffic, while also providing a time-proven traffic safety barrier. Since the catchment barrier can be installed prior to any work and remain in place throughout the progression of the blasting, it must also be strong enough to prevent moderate sizes of shot rock material from reaching the roadway during blasts. The subject invention can also be used as a semipermanent or permanent modular rock fall protection device where there is a need to protect an area from rocks falling from a rock face, where no rock excavation or scaling is occurring.

The subject invention thus provides a new type and level of protection in these rock excavation or scaling sites, and to protect near rock faces. The advantages of the subject invention are best illustrated by examining the types of rock fall protection devices in the prior art.

U.S. Pat. No. 4,335,868, issued June 22, 1982 to Ribbert discloses an avalanche fence consisting of uphill and downhill catchment nets or planks attached to spaced apart supports having an inverted U shape, with the ends of each U inserted into holes in the ground either directly or by mounting on pins projecting from the ground.

U.S. Pat. No. 4,730,810, issued Mar. 15, 1988 to Rambaud discloses a protective barrier for containing rock falls on sloping ground. The barrier comprises a sheet of netting held spread out upright by spaced apart posts. Each post is held upright by uphill and downhill stays on a guide formed by an endless cable looped around uphill and downhill pulleys. A mooring cable equipped with a shock absorbing means is connected to each cable loop to permit controlled downhill displacement of the post on the guide when the netting or the posts are struck by falling rock units.

U.S. Pat. No. 2,813,197, issued Nov. 12, 1957 to Hubbard et al. discloses signal wires strung between an end post and an intermediate post which are protected from falling rocks by a litter trap comprising a wire mesh extending between frame members. Each frame member is pivotally connected at its lower end to a post or is held at an angle to the post by a bar.

Various types of fence structures are also disclosed in the prior art which are not constructed to protect against rock falls.

U.S. Pat. No. 2,709,073, issued May 24, 1955 to Dougherty discloses a fence composed of prefabricated wire screen panels carried by spaced apart corner posts and line posts. The posts are mounted in sleeves set in grout. Each wire screen panel has a frame structure of horizontal top and bottom sails and vertical side rails. Mounting rings welded to the respective vertical side rails slideably connect each panel to two successive posts.

U.S. Pat. No. 1,012,868, issued Dec. 26, 1911 to Laney discloses a fence assembled from precast concrete panels. Each panel has along its lower edge transverse bars terminating in deepening lugs or feet which can be imbedded in the ground to anchor and support the panels upright. To assemble a fence, the panels are placed end to end with successive panels being hinged together by coupling pins inserted through eyes at the ends of the panels. Spaced posts embedded in the panels extend from the upper edges of the panels and support an upper rod with a strand of barbed wire.

U.S. Pat. No. 4,685,656, issued Aug. 11, 1987 to Lee et al. discloses a racetrack barrier assembled and surmounted by a weldmeshed fence. The weldmeshed sheets are connected to posts set in sleeves disposed in vertical grooves at the ends of the barrier modules.

Thus, it is readily apparent from the types of fences and catchment barriers disclosed in the prior art that there is a need for a modular rock fall protection device that would permit all the normal range of construction activities found on a rock excavation or scaling site to be carried on virtually unrestricted directly adjacent to traffic, while so providing a time-proven traffic safety barrier. There is also a need for a modular rock fall protection device in semi-permanent or permanent sites to protect an area from rocks falling from a rock face, where no rock excavation or scaling is occurring.

SUMMARY OF THE INVENTION

It is thus an object of the subject invention to provide a modular rock catchment barrier which permits all the normal range of construction activities found on a rock excavation or scaling site to be carried on virtually unrestricted directly adjacent to traffic.

It is a further object of the subject invention to provide a rock catchment barrier which can be installed prior to any work and remain in place throughout the progression of any blasting. Thus, it is an object of the subject invention to provide a barrier which is strong enough to prevent moderate sizes of shot rock material from reaching the roadway during blasts.

It is an object of the subject invention to provide a rock catchment barrier which can be used in semi-permanent or permanent sites to protect an area from rocks falling from a rock face, where no rock excavation or scaling is occurring. This allows rock faces to be left adjacent to roadways while allowing motorists to be protected.

It is an additional object of the subject invention to provide a rock catchment barrier which is a precast concrete traffic safety barrier having a safety shape.

It is a further object of the subject invention to provide a rock catchment barrier which is strong.

It is a further object of the subject invention to provide a rock catchment barrier which is reusable.

It is still a further object of the subject invention to provide a rock catchment barrier which is compact and easily erected.

It is also an object of the subject invention to provide a rock catchment barrier which is easily modified to increase its strength.

It is another object of the subject invention to provide a rock catchment barrier which also serves as a time-proven traffic safety device along a travel way, which due to its modular nature is flexible in the horizontal plane such that it accommodates horizontal curvature of the highway.

In furtherance of these objectives, the subject invention provides a rock catchment barrier comprising a plurality of modules. Each of these modules comprises a concrete base having a top surface, a post, a concrete barrier, a means for connecting the post to the top surface of the concrete base, a means for connecting the concrete barrier to either side of the concrete base, and a means for catching rocks, the means attachable to the posts, wherein when the concrete base is connected to the concrete barrier, and the posts are connected to the concrete base and the means for catching rocks, a resulting module is formed.

The resulting module is connectable to a second module in a plurality of similarly constructed modules to form a series of connected modules, each capable of catching rocks.

In a first embodiment of the subject invention, the rock catchment barrier is designed to withstand a direct impact of eight (8) foot tons energy at the top of a post, the most damage susceptible point, without sustaining damage. This corresponds to a 300 pound rock falling 52 feet. As the point of impact moves away from the post, the energy absorbing capability of the system increases substantially and impacts several times greater than this will not cause damage at the mid-span of the fence panels used as the means for catching rocks.

The modular nature of the system enhances the reusability by both limiting the extent of any damage and making damage easily repairable. It also allows the system to be flexible in the horizontal plane such that the system accommodates horizontal curvature of the highways. In one embodiment, the module further comprises a concrete beam positioned such that the concrete base, concrete barrier, and concrete beam form a cavity therebetween. Earth backfill placed in the cavity and positioning of the post at the back of the concrete base allow the entire base assembly to be self protecting. The cost of the base assembly is approximately 75% of the system cost. The posts, although designed to exceed the strength necessary for normal service, are designed to be the weak point of the system and are considered sacrificial elements in the event of a severe overload. The posts, which are also designed to be easily replaced, account for less than 1% of the system cost.

The fence panels are panelized for easy installation and replacement. The panels fit between the posts and are attached with shackles. The fence panels comprise cable mesh fence panels which are partially protected by a chain link fencing overlay and are designed to take repeated strikes without sustaining critical damage. The chain link fence is also considered to be sacrificial.

The system is designed to work in conjunction with and to become part of the standard work zone protection system. The modular barrier units and earth protection blanket are part of the normal protection scheme used in rock excavation areas. Since space within the work zones are frequently quite restricted and traffic is usually moving within two feet of the work zone barrier, the ability to provide the high level of traffic protection and rock containment that the subject invention provides in the five (5) foot space that it occupies is a major and unique feature of this invention. The use of drop-in posts and shackles for assembly makes the system quick and easy to erect.

Should additional strength be desirable or necessary the system is easily modified to increase its strength. Additional sliding and overturning resistance can be obtained by pinning barrier units using stakes or using tie-downs on the concrete base. Fence strength can be increased with larger posts or heavier post sections and stronger fence panels.

The subject invention also provides a rock catchment barrier comprising a first and second concrete base, each having a top surface, a first and second post, a concrete barrier, a means for connecting the posts to the concrete bases, a means for connecting the concrete barrier to the concrete bases, and a means for catching rocks, the means attachable to the posts, wherein when the first concrete base and the second concrete base are connected to the concrete barrier, and the first post is connected to the first concrete base and the means for catching rocks, and the second post is connected to the second concrete base and the means for catching rocks, a rock catchment barrier is formed. This rock catchment barrier may further comprise a concrete beam and a means for connecting the concrete beam to the concrete bases, wherein when the concrete beam is connected to the first and second concrete bases, a cavity is formed therebetween.

The subject invention also provides a base useable in a rock catchment barrier comprising a concrete block. Further provided is a beam useable in a rock catchment barrier comprising a concrete beam and capable of forming a cavity when used in the catchment barrier.

BRIEF DESCRIPTION OF THE FIGURES

These and other objects, features and advantages of the invention will be evident from the following detailed description when read in conjunction with the accompanying drawings in which:

FIG. 6a is an overhead view of a first embodiment of the rock catchment barrier.

FIG. 6b is a front elevation view of the rock catchment barrier of FIG. 6a.

FIG. 8 is a top view of a shackle for connection of the fence panels to the post shown in FIG. 7.

FIG. 9a is a side elevation view of one embodiment of the post connection to the concrete base.

FIG. 9b is a side elevation view of the post connection to the concrete base of FIG. 9a, after the beam has sustained an impact causing the plate to bend and the shear pin to shear.

DETAILED DESCRIPTION OF THE INVENTION

Figure 1A:
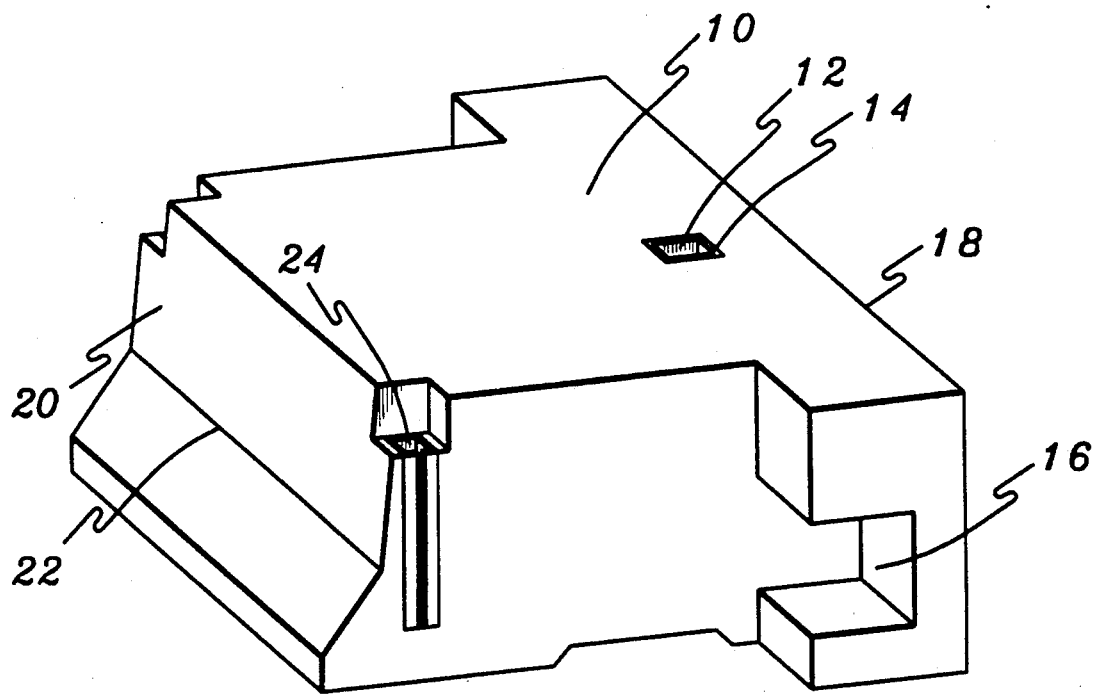
FIG. 1a is a view of a first embodiment of the concrete base of the subject invention.

The subject invention provides a rock catchment barrier comprising a plurality of modules, each module comprising a concrete base having a top surface, a post, a concrete barrier, a means for connecting the post to the top surface of the concrete base, a means for connecting the concrete barrier to either side of the concrete base, and a means for catching rocks, the means attachable to the post, wherein when the concrete base is connected to the concrete barrier and the post is connected to the concrete base and the means for catching rocks, a resulting module is formed.

In a first embodiment of the subject invention, the resulting module is connectable to a second module in a plurality of similarly constructed modules to form a series of connected modules, each capable of catching rocks.

The rock catchment barrier may additionally comprise a concrete beam and a means for connecting the concrete beam to either side of the concrete base, wherein when the concrete base is connected to the concrete beam and the concrete barrier, a cavity is formed therebetween.

A preferred post for use in the rock catchment barrier comprises a two piece post. The two piece post comprises a first piece and a second piece and a means for attaching the two pieces of the post. The means for attaching the two pieces preferably comprises a shock absorbing first plate attachable to the first piece of the post, a second plate attachable to the second piece of the post, a first and a second bolt, an angle iron, and a shear pin.

In a preferred embodiment of the two piece post, the shock absorbing first plate is attached to the first piece of the post by welding and is attached to the second plate by the first bolt. The second plate is attached to the second piece of the post by welding and the angle iron is attached to the first piece of the post by the shear pin and to the second plate by the second bolt. A shock upon the first piece of the post caused by falling rock is absorbed by the shock-absorbing first plate. An impact caused by a falling rock upon the first piece of the post causes the post to move in a direction away from the point of impact. This causes the first plate to bend and the shear pin to shear. In a preferred embodiment of the subject invention, the post can then be tilted back to its vertically upright position, thus bending back the first plate, and a new shear pin can be inserted.

Preferably, the front surface of the concrete base and the front surface of the concrete barrier are safety shaped, so that the front surfaces form a continuous safety shaped barrier. A safety shape is well known in the construction field, and means that the base and barrier are widest at their bottom portion, then angle back and up to their top portion. This safety shape is a time-proven traffic safety barrier which provides effective protection directly adjacent to traffic. When a car or vehicle impacts the safety-shaped barrier, it is redirected along the roadway in a direction parallel to the traffic and is not bounced into the traffic. The car thus travels along the safety-shaped barrier.

The means for connecting the posts of the top surface of the concrete base preferably comprises an aperture in the top surface of the base. The aperture is preferably located toward a rear surface of the top surface. In one embodiment, the means for connecting the post to the top surface of the concrete base further comprises a metal sleeve inserted into the aperture. The post or the second piece of the two piece post is then inserted within this sleeve.

The means for connecting the concrete barrier to either side of the concrete base preferably comprises a groove located within either side of the concrete base, a groove in the concrete barrier, and an H key having flanges insertable within the grooves.

The means for catching the rocks preferably comprises a fence panel of cable mesh fence and chain link fence attachable over said cable mesh fence. The cable mesh fence comprises a perimeter cable and an interior cable which is weaved around this perimeter cable. The interior cable is diagonally woven. A supporting cable may also be used which is attached to the top of the fence panel and provides support for the fence panel, thus preventing the cable mesh and the chain link fence from sagging in the center portion between the posts where the cable mesh and chain link fence are attached. This fence panel is preferably attached to the post by means of shackles.

The concrete beam is preferably connected to either side of the concrete base by a notch on either side of the concrete base of a shape which allows the beam to be inserted therein. The concrete beam in cross-section may be square and the notch in the concrete base is also square, allowing the beam to be inserted therein. In another embodiment of the subject invention, the cross section of the concrete beam is L shaped and the notch in the concrete base is also L shaped, allowing the beam to be inserted therein.

In one embodiment of the subject invention the notch is located toward a rear surface of the concrete base. The notch could be located near the bottom portion of the concrete base or located in the top portion of the concrete base allowing connection of the concrete beam at each side of the concrete base.

Each of the concrete base, concrete barrier and concrete beam may have apertures substantially vertically therethrough for anchoring the concrete base, concrete barrier or concrete beam, respectively, to earth by means of stakes.

In one embodiment of the subject invention which comprises using the beams, the cavity which is formed is capable of being filled. One embodiment of the rock catchment barrier which has such a cavity further comprises fill within the cavity.

The subject invention also provides a rock catchment barrier comprising a first and second concrete base, each having a top surface, a first and second post, a concrete barrier, a means for connecting the posts to the concrete bases, a means for connecting the concrete barrier to the concrete bases, and a means for catching rocks, the means attachable to the posts, wherein when the first concrete base and the second concrete base are connected to the concrete barrier, and the first post is connected to the first concrete base and the means for catching rocks, and the second post is connected to the second concrete base and the means for catching rocks, a rock catchment barrier is formed.

A preferred embodiment of this rock catchment barrier further comprises a concrete beam and a means for connecting the concrete beam to the concrete bases, wherein when the concrete beam is connected to the first and second concrete bases, a cavity is formed therebetween.

The rock catchment barrier of the subject invention is preferably constructed as precast concrete bases, barriers, and beams. The precast components of the barrier can then be easily and efficiently assembled on a site, and can also be disassembled and relocated to a new site. The rock catchment barrier may also be cast in place, such as where the rock catchment barrier is used for semi-permanent or permanent protection from rocks falling from a rock face.

The subject invention also provides a base useable in a rock catchment barrier, the base comprising a concrete block. Further provided is a beam useable in a rock catchment barrier, the beam comprising a concrete beam and capable of forming a cavity when used in the rock catchment barrier.

These and other embodiments of the subject invention are best understood when read in conjunction with FIGS. 1-10.

Figure 10:
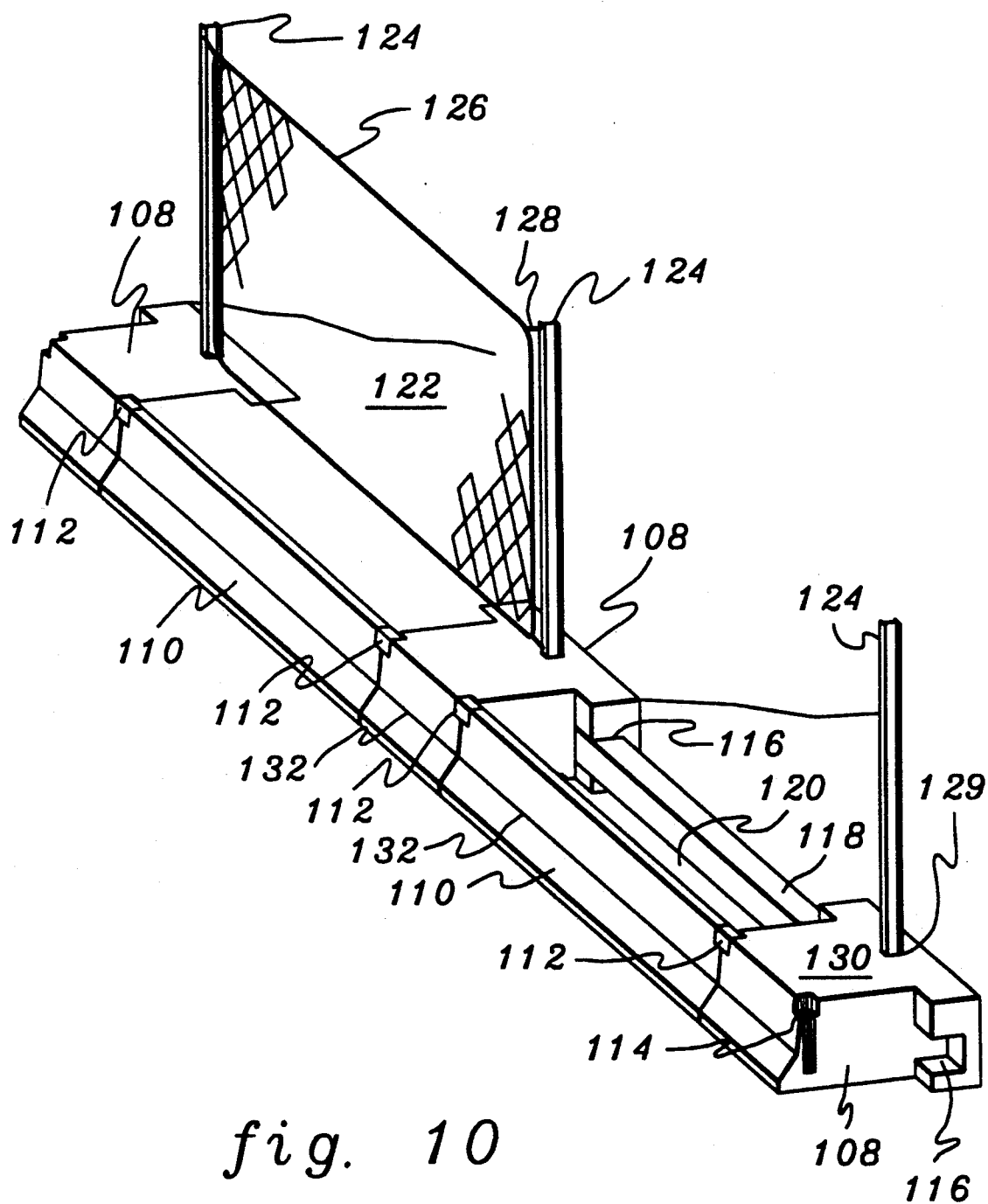
FIG. 10 is a view of a first embodiment of connected modules of the rock catchment barrier of the subject invention.

FIG. 10 illustrates a first embodiment of the subject invention wherein the rock catchment barrier is comprised of several connected modules. Each module comprises a base portion, which is composed of a concrete base (108), a concrete barrier (110), a beam (118), and a cavity (120). The cavity (120) is filled, and the fill is gradually graded off towards the back of the rock catchment barrier (122).

The upper portion of the rock catchment barrier comprises a post (124) and a fence panel which acts as a means for catching rocks (126). The fence panel is attached to the post by shackles (128).

The front portion of the rock catchment barrier is safety-shaped and forms a continuous barrier (132). The rock catchment barrier comprises a means for connecting the post to the top surface of the concrete base (129), a means for connecting the concrete barrier to either side of the concrete base (112,114), and a means for connecting the concrete beam to either side of the concrete base (116).

Figure 2:
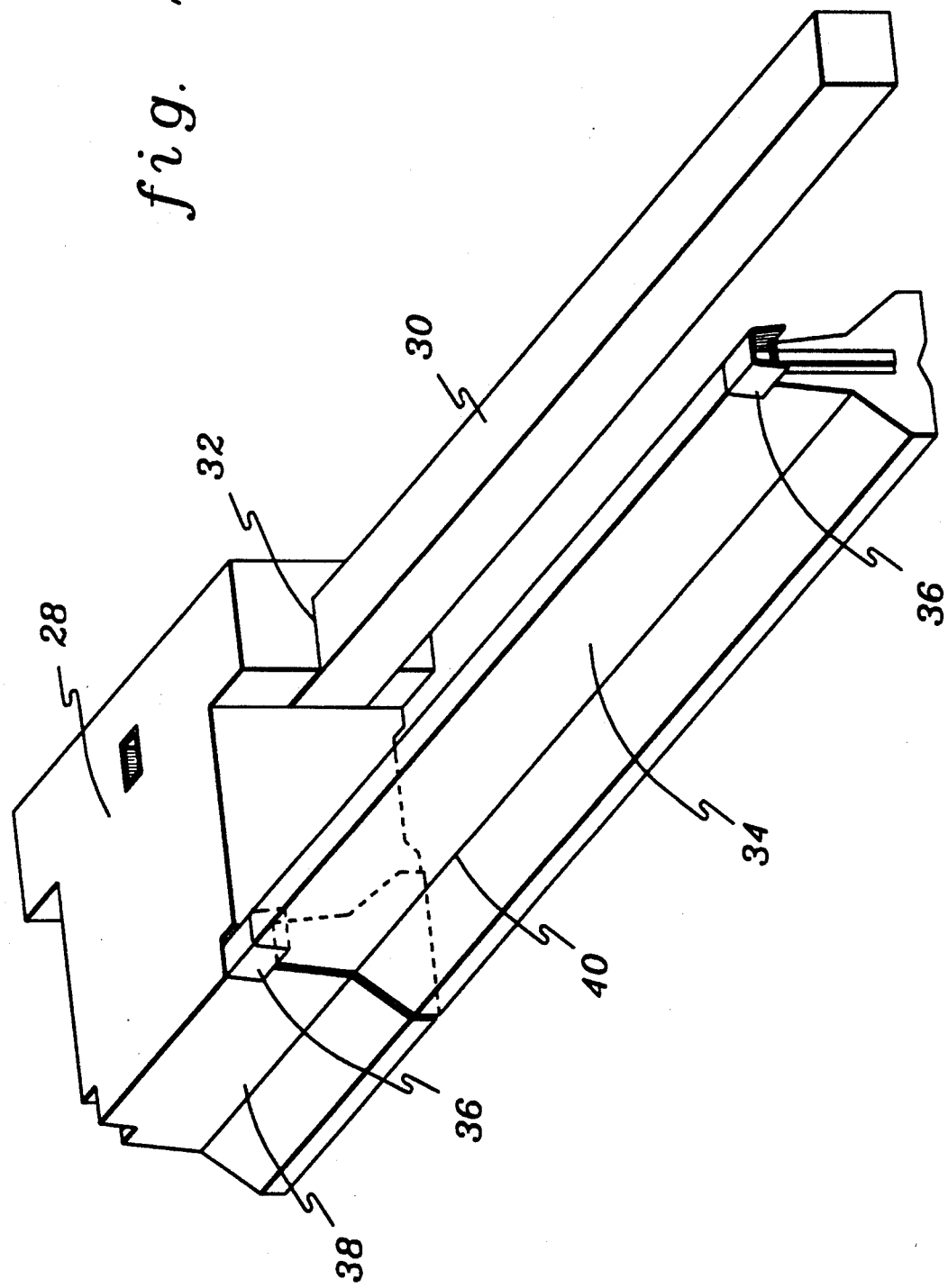
FIG. 2 is a view of a first embodiment of a module of the rock catchment barrier of the subject invention.

FIG. 2 illustrates the base portion of the rock catchment barrier. The base portion comprises the concrete base (28), which has a front surface which is safety-shaped (38), and the concrete barrier (34), which is attached to the concrete base by means of a H-key connector (36). The base portion further comprises a beam (30) which is attached to the concrete base by means of a notch on either side of the concrete base (32).

FIG. 2 illustrates a concrete beam (30), which in cross-section is square in shape, which is inserted into a square shaped notch on the side of the concrete base (32).

Figure 3:
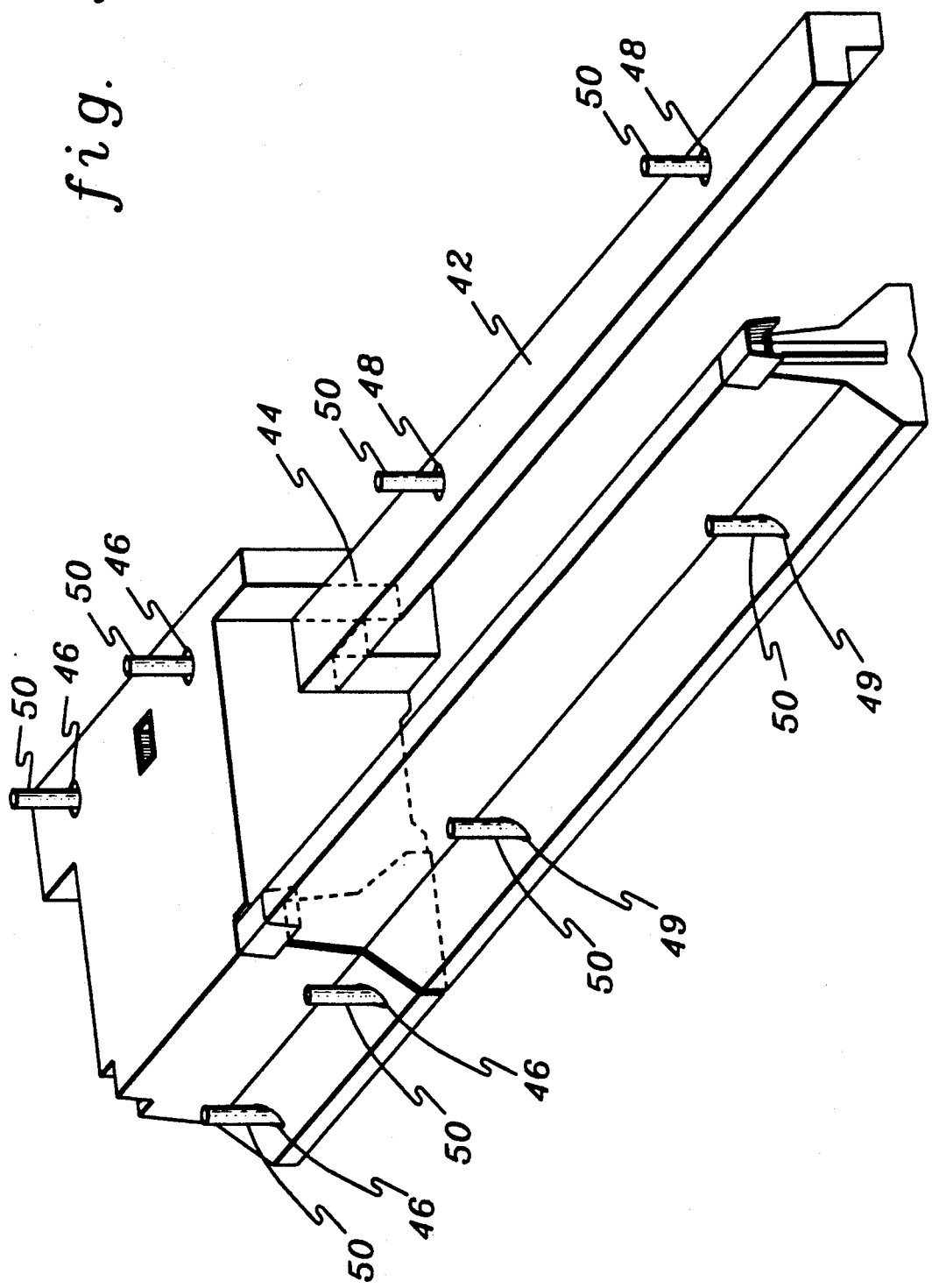
FIG. 3 is a view of a second embodiment of a module of the rock catchment barrier of the subject invention.
Figure 4:
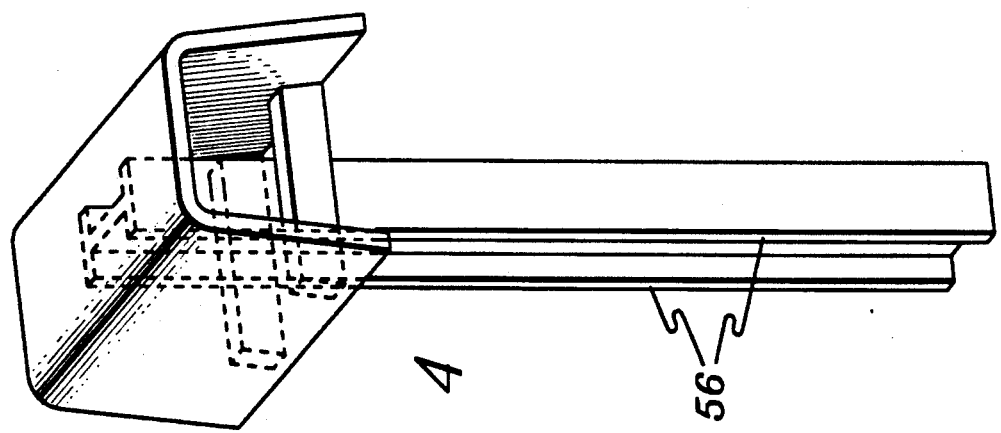
FIG. 4 is a view of an H-key connector.

FIG. 3 illustrates an additional embodiment of the subject invention wherein the beam in cross-section is L shaped (42) and is inserted into an L shaped notch (44) in the side of the concrete base.

FIG. 3 also illustrates an additional embodiment of the subject invention wherein the concrete base has apertures (46) substantially vertically therethrough for anchoring the concrete base to earth by means of stakes (50). The concrete barrier also has apertures (49) substantially vertically therethrough for anchoring the concrete barrier to earth by means of stakes (50). Additionally, the concrete beam has apertures (48) substantially vertically therethrough for anchoring the concrete beam to earth by means of stakes (50).

FIG. 1a is a perspective view of a concrete base of the subject invention. The front surface (20) of the concrete base is safety-shaped (22). The top surface (10) of the concrete base has an aperture therein (12) for connecting a post to the concrete base. A metal sleeve (14) is inserted into the aperture (12). Near the rear surface of the concrete base (18), there is a notch in each side of the concrete base (16) of a shape which allows a beam to be inserted into the concrete base. The concrete base further comprises a groove (24) located on either side of the front surface of the concrete base for connecting a concrete barrier to the concrete base.

Figure 1B:
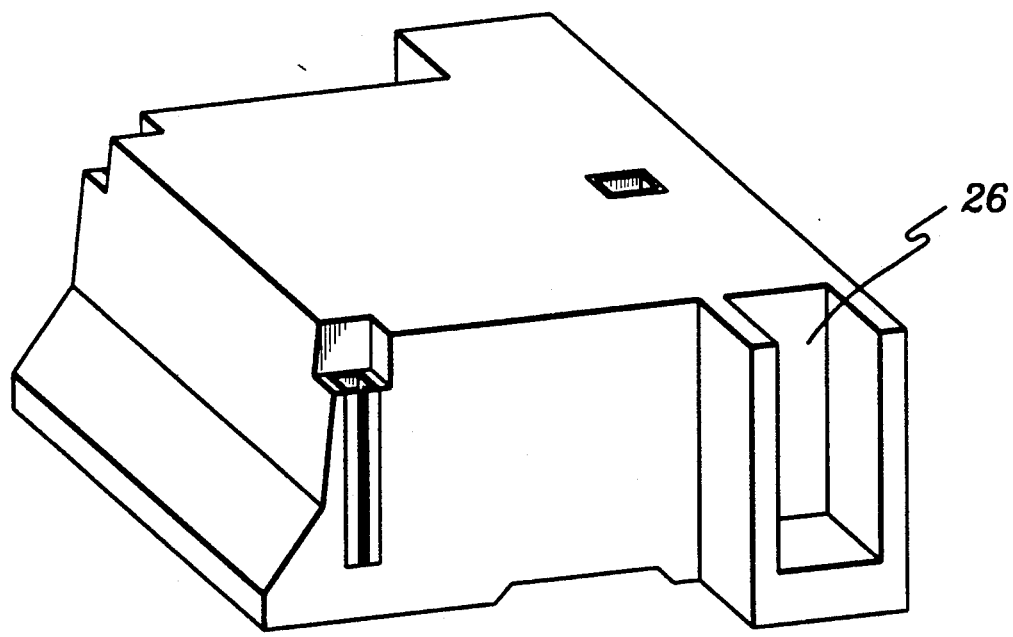
FIG. 1b is a view of a second embodiment of the concrete base of the subject invention.

FIG. 1b illustrates an additional embodiment of the concrete base of the subject invention wherein the notch in each side of the concrete base (26) of a shape which allows the beam to be inserted therein is in the top surface of the concrete base.

FIG. 3 illustrates a further embodiment of the concrete base of the subject invention wherein the notch (44) in each side of the concrete base is L shaped.

Figure 5:
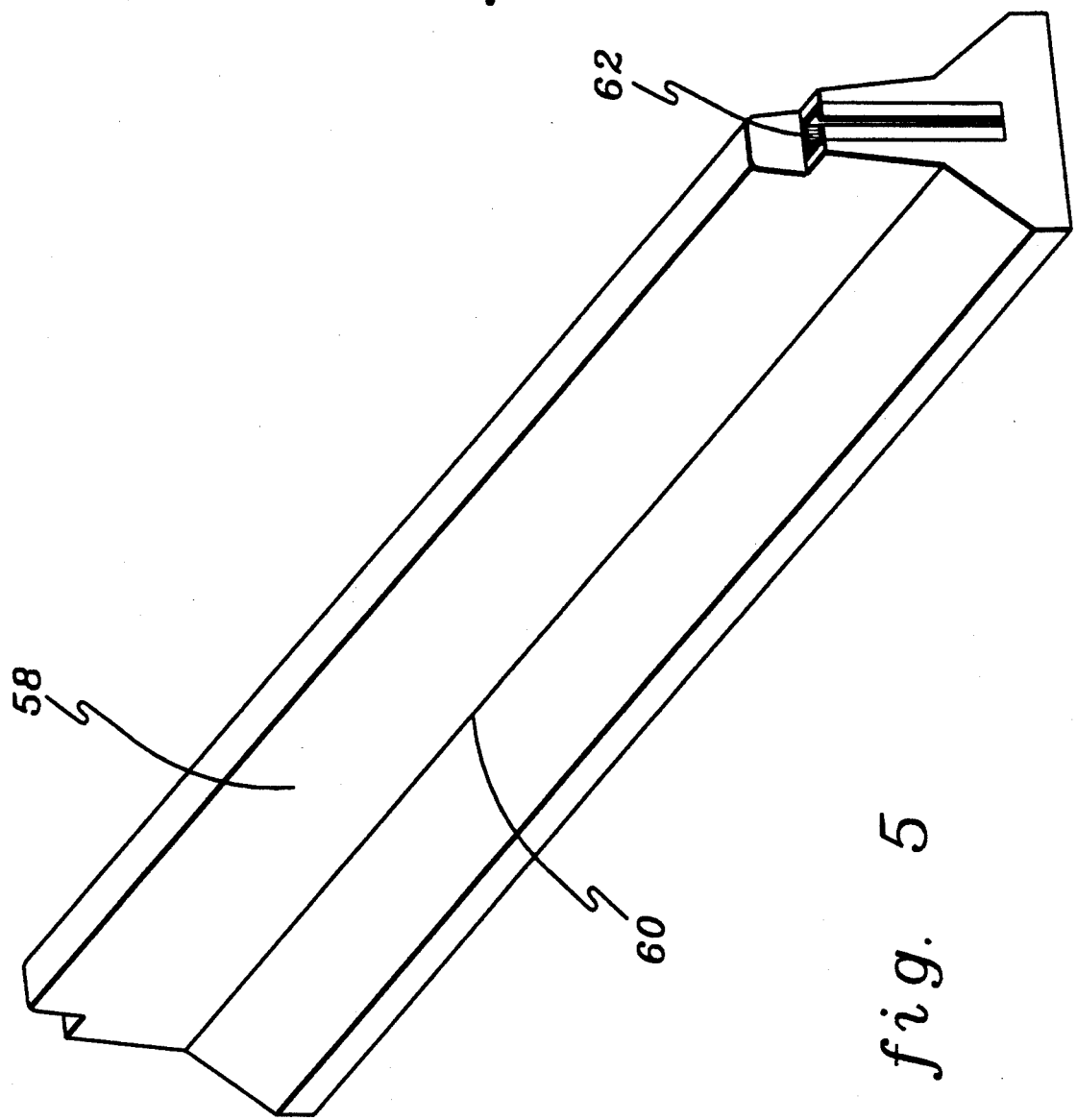
FIG. 5 is a view of a first embodiment of the concrete barrier of the subject invention.

FIG. 5 illustrates the concrete barrier of the subject invention. The front surface (58) of the concrete barrier is safety-shaped (60). The concrete barrier has a groove located on each end of the concrete barrier (62) which provides a means for connecting the barrier to the concrete base. The barrier is connected to the concrete base by inserting an H-key (see FIG. 4) having flanges (56) into the grooves of the concrete barrier (62) (see FIG. 5) and the grooves (24) of the concrete base (see FIG. 1a).

A post is attached to the concrete barrier by inserting it into the aperture (12) in the top surface (10) of the concrete base (see FIG. 1a). The aperture may additionally comprise a metal sleeve (14).

FIG. 9a illustrates one embodiment of the post of the subject invention which is inserted into the metal sleeve on the top surface of the concrete barrier. In this embodiment of the subject invention, the post comprises a two piece post. This two piece post comprises a first piece of the post (90), a second piece of the post (104) inserted into the aperture (106) of the concrete base (88), a shock-absorbing first plate (92), a second plate (94), a first bolt (98), a second bolt (100), an angle iron (96), and a shear pin (102).

The shock absorbing first plate (92) is attached to the first piece of the post (90) by welding and is attached to the second plate (94) by the first bolt (98). The second plate (94) is attached to the second piece of the post (104) by welding. The angle iron (96) is attached to the first piece of the post (90) by the shear pin (102) and is also attached to the second plate (94) by the second bolt (100). A shock upon the first piece of the post (90) is absorbed by the shock-absorbing first plate (92).

FIG. 9b illustrates the result of a shock being absorbed by the shock-absorbing first plate, wherein the first plate (92) bends and the shear pin (102) shears.

In a further embodiment of the subject invention, the post may be a simple one piece post (124) (see FIG. 10) which is inserted into the metal sleeve which has been inserted into the aperture (129) in the top surface (130) of the concrete base (108).

FIG. 6a is an overhead view of one embodiment of the rock catchment barrier of the subject invention. The rock catchment barrier comprises a first concrete base (64), a second concrete base (66), a concrete barrier (68), a first post (72), a second post (74), and a beam (76).

The concrete barrier (68) is connected to the side of each concrete base by an H-key connector (70). The connection of the concrete bases (64,66), the concrete beam (76) and a concrete barrier (68) forms a cavity therebetween (87). The upper portion of the rock catchment barrier comprises a first post (72), a second post (74), a chain link fence (78), a cable mesh fence (80), and a supporting cable (82) which is connected to the cable mesh fence by shackles (84).

FIG. 6b shows a side elevational view of the rock catchment barrier shown in FIG. 6a. In FIG. 6b the concrete bases (64,66) are connected to the concrete barrier (68) by the H-key connectors (70). The upper portion of the rock catchment barrier comprises a first post (72) and a second post (74). Connected to the first (72) and second (74) posts by means of shackles (86) are the fence panels. The fence panels comprise a cable mesh fence (80) and a chain link fence (78) which is overlaid on the cable mesh fence. To provide support for the cable mesh fence, a supporting cable (82) is provided which is connected to the cable mesh fence by shackles (84).

Figure 7:
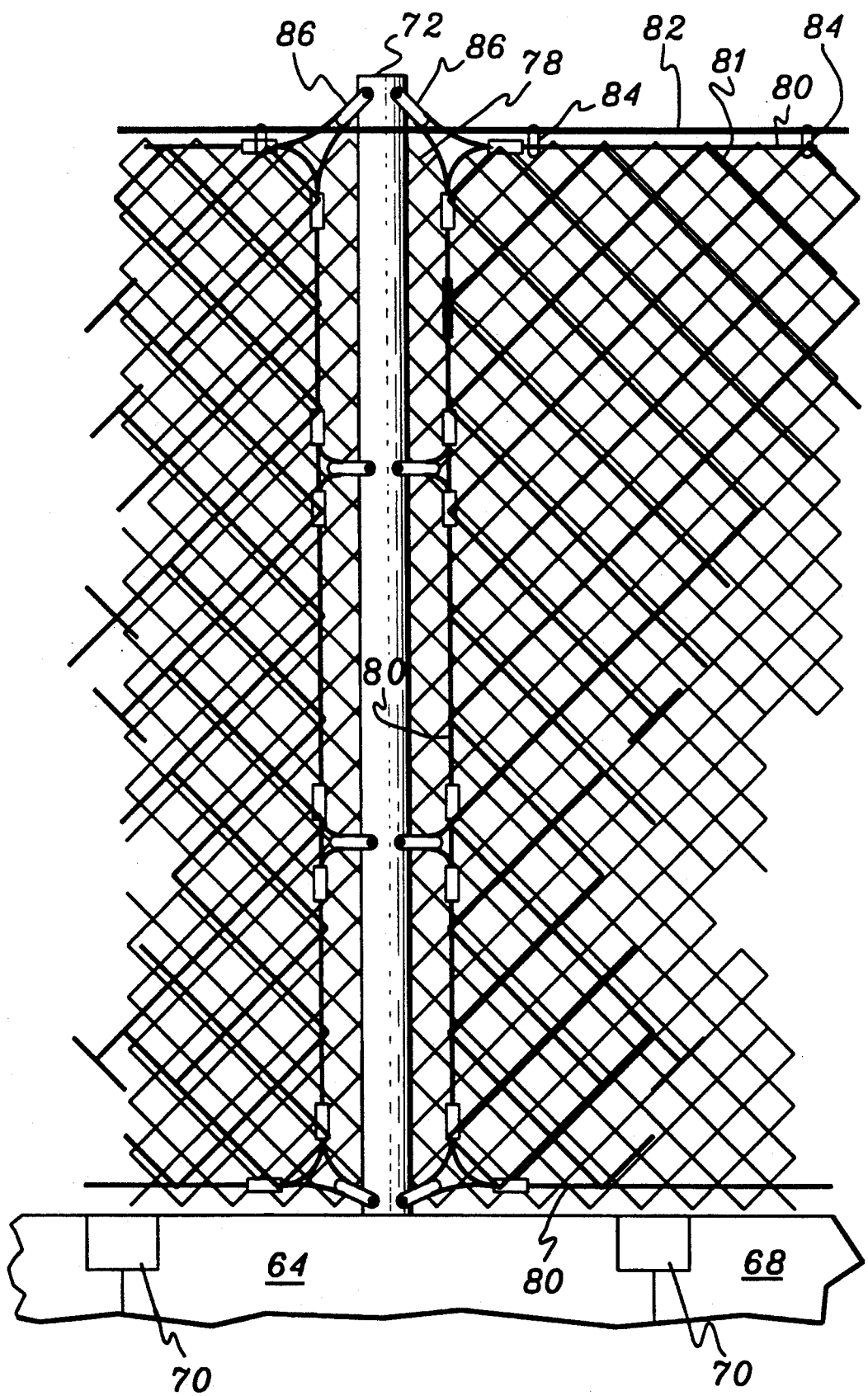
FIG. 7 is a front elevation view of the attachment of the fence panels to the post shown is FIG. 6b.

FIG. 7 shows a close up view of the fence panels and their connection to the post shown in FIG. 6b. The close up shows a concrete base (64) which is connected to the concrete barrier (68) by means of H-key connectors (70). The post (72) is connected to the fence panels and provides support for these panels.

The fence panels are comprised of a cable mesh fence which is overlaid with a chain link fence (78). The cable mesh fence is attached to the post by means of shackles (86). The cable mesh fence is comprised of a perimeter cable (80) which has interwoven around it an interior cable (81). Providing support for this cable mesh fence is a supporting cable (82), which is connected to the cable mesh fence by means of shackles (84).

FIG. 8 is a close up view of the shackles used for connecting the fence panels to the post. Chain link fence (78) goes around one side of the post and the cable mesh fence (80,81) is attached to the post by means of shackles (86) on the opposite side of the post. The supporting cable (82) for the cable mesh fence is also attached to the post.

When taken together the modules of the rock catchment barrier of the subject invention provide a rock catchment barrier as shown in FIG. 10. The base portion comprises the concrete bases (108), the concrete barrier (110), and the concrete beam (118), which are connected so as to provide a cavity (120) which can be filled with earth materials. When the earth material is filled (122) it is gradually graded off toward the work zone area.

The upper portion of the rock catchment barrier includes the post (124), and the fence panels (126) which are connected to the post by means of the shackles (128). The posts are inserted into the concrete bases through the apertures on the top surface thereof (129). The beams are connected to the bases by means of a notch in each side thereof (116). The concrete barrier is connected to the concrete base by means of a groove located in each side of the concrete base (114) and similar groove located on each end of the concrete barrier. An H-key connector (112) having flanges is inserted into the grooves of the concrete barrier and the concrete base, thus connecting the two modules.

In one embodiment of the subject invention the concrete beam is not present and the concrete base may then be square without having a notch for connecting the beam in the back portion thereof.

Preferably, the concrete base has a front surface which is safety-shaped and the concrete barrier also has a front surface which is safety-shaped so that when the concrete base and the concrete barrier are connected to form the rock catchment barrier, the entire front surface of the unit is safety-shaped. The back portion of the concrete barrier may also be safety-shaped or may be perpendicular or of any other suitable shape.

Specifically, the preferred embodiment of the subject invention provides a ten (10) foot high modular rock catchment barrier. The modular rock catchment barrier is composed of precast concrete units used for the base portion and a fence portion. Precast concrete units include three components: concrete bases, concrete barriers, and concrete beams.

The concrete bases are linked to the concrete barriers using a standard H-key. The concrete beam is then installed between the concrete bases in a notch cast into the bases. These modules, when assembled, form a hollow cavity area which is then filled with earth material. The earth backfill increases both the tipping and sliding resistance of the entire assembly, as well as protecting the underlying roadway and the base assembly itself from rock impacts.

Because the face of the concrete bases has the same safety shape as the concrete barrier units, the completed base assembly acts as part of the work zone protection as well as providing a base for the fence portion.

The dimensions, joint connections, material details and anchoring details for the concrete barriers conform to those well-known to those skilled in the construction and civil engineering fields. The barrier sections are precast concrete units.

The concrete bases preferably form a T shape with the cross portion of the T being the back surface of the concrete base. This is the surface which will face the rock excavation area. The back surface is preferably 7 feet long with the front surface, the surface which faces the traffic, being 5 feet long. The width of the precast concrete base from the front to the back surface, when measured at the top of the concrete base, is preferably 5 feet. The safety shape of the front surface of the concrete base results in a width when measured at the base of the unit, from the front surface to the rear surface, of 5 foot 9 inches. The height of the concrete base in both the front and the rear is preferably 2 feet 8 inches. The entire concrete base is reinforced with bars embedded within the concrete.

The outer portion of the cross section of the T which forms the rear surface of the concrete base has a notch in each side of the concrete base for connecting the concrete beam. The notch is preferably located 6 inches from the rear surface of the concrete base and 6 inches from the bottom surface of the concrete base, forming an indentation which has a depth and a height of 12 inches, thus allowing the concrete beam which in cross section forms a square with 12 inch sides to be inserted therein.

The concrete base also has an aperture located in its top surface. The center of this aperture is 12 inches from the rear surface of the concrete base and is located 3 feet 6 inches from either side of the concrete base. This aperture additionally comprises a 6 inch by 6 inch by $\frac{1}{4}$ inch structural steel tube inserted into the aperture which extends to the bottom surface of the concrete base.

The concrete base also comprises two 4 inch by 4 inch by ½ inch tubes made of steel for H-key connection. These are located on each side of the concrete base at the front of the base.

The concrete beams are preferably 19 foot 8 inches long and in cross section comprise a square with one foot sides.

The pre-cast concrete barriers are preferably 2 feet 8 inches high with a top width of 6 inches and a bottom width of 2 feet, with each side of the concrete barrier unit being safety shaped. The concrete barriers are preferably 19 feet, 11½ inches in length and each end of the concrete barrier has a 4 inch by 4 inch by 1½ inch tube located therein for insertion of a standard H-key connector therein. These concrete barriers are also reinforced throughout using metal bars.

The H-key connector preferably has a height of 1 foot 8 inches and a width at the top of 6 inches.

The posts which are inserted into the concrete base are preferably 2 foot 8 inches high in the portion which is inserted into the aperture of the concrete base and 10 foot 6 inches high in the portion which extends above the top of the concrete base. These posts are preferably W5×16 posts.

Attached to these posts is fence panel which provides the means for catching the rocks. The fence panels comprise a heavy cable mesh panel located on the traffic side of the rock catchment barrier. The heavy cable mesh panel includes a perimeter cable which extends around the entire portion of the cable mesh panel and includes a lighter duty interior cable which is woven around the perimeter cable in a diagonal fashion.

On the work zone side of the rock catchment barrier a chain link fence is overlaid on the heavy cable mesh panel. This chain link fence is fastened to the heavy cable mesh panel. This entire fence panel, composed of the heavy cable mesh panel and the chain link fence, in addition to being supported by the post, is supported by a heavy supporting cable which runs near the top of each consecutive post and provides additional support for the fence panel. This cable prevents sagging at the center of the fence panel located between the posts. The supporting cable is held taunt by anchoring it at either end of the entire rock catchment barrier device. The entire panel is attached to the post on each end by the use of ¾ inch shackles. The fence panels are connected to the supporting cable by the use of smaller shackles.

When in use at a typical construction site, the rock catchment barrier includes a concrete beam which forms a cavity, and the cavity contains fill which is gradually graded off from the rock catchment barrier towards the work zone area.

The mesh size of the heavy cable mesh fence is 8"×8" square with an interior cable diameter of ¼"6×7 construction with a minimum breaking strength of 4,838 pounds.

The perimeter cable of the heavy cable mesh fence has a 5/16" diameter, 6×7 construction with a minimum breaking strength of 8,690 pounds. The heavy cable mesh fence is diagonally woven. All cable mesh fence is braided with high strength, hot dipped, galvanized steel clips pressed on so that they are non-movable.

The supporting cable has a diameter of 5/16" and is 6×7 construction with a minimum breaking strength of 8,690 pounds.

Two aluminum stop sleeves are used at all locations where two individual cables are joined together.

All cable mesh fence panels are composed of steel wires which have been individually galvanized prior to being woven into the designated cable configuration. Cable mesh panels are covered with chain link fencing fabric to prevent particles smaller than 8" in diameter from penetrating the barrier.

Chain link fencing fabric and attaching wire is diagonally woven in order to assure maximum strength of the entire fence panel.

Galvanized steel chain link fence fabric conforms to the requirements of AASHTO M181 chain link fence type 1. The mesh size and the coated wire diameter is 2" and 9 gauge (0.148 inches) respectively. A zinc coating on the 2" mesh is galvanized with a class D coating (2.0 oz. per foot) by the hot dipped process after weaving.

The posts are fabricated from W 5×16 wide flange members meeting ASTM A36-84 for preformed shapes. All posts and related hardware are hot dipped galvanized in accordance with AASHTO M111-80, after all drilling, welding and cutting.

All miscellaneous hardware, such as shackles, thimbles, bolts, etc. are hot dipped galvanized.

Each run or bay of rock catchment barrier modules are fastened together to form a continuous chain. After placement, each successive module is moved longitudinally to remove the slack in the joint between the modules. The modules at each end of the run or bay are anchored by firmly anchoring the ends of the supporting cable, in order to reduce movement of the rock catchment barrier on structures or on areas where limited deflection is desired. The ends of the barrier run may be fitted with tapered end sections, flared back or fitted with an impact attenuation device.

Delineation of the rock catchment barrier makes the barrier visible to approaching traffic as well as traffic which is adjacent to the barrier. Delineation may be by one or more of the following: warning lights, delineators, pavement marking, reflectorized tape placed on the barrier, or reflective paint.

The fence panels are installed along the rock catchment barrier after the base portion has been installed. The W 5×16 post is installed in a 6"×6"×¼" structural steel tube cast in the precast concrete bases.

Although the subject invention has been described with regard to the embodiments disclosed herein, variations in the invention may be made without departing from the spirit of the invention. Any such variations are intended to be within the scope of the invention as defined by the following claims.

We claim:

1. A rock catchment barrier comprising a plurality of modules, each said module comprising:
   a concrete base having a top surface;
   a post;
   a concrete barrier;
   a means for connecting said post to said top surface of said concrete base;
   a means for connecting said concrete barrier to either side of said concrete base; and
   a means for catching rocks, said means attachable to said post;
   wherein when said concrete base is connected to said concrete barrier, and wherein when said post is connected to said concrete base and said means for catching rocks, a resulting module is formed;
   wherein said rock catchment barrier further comprises means for temporarily stabilizing said rock catchment barrier, said means for temporarily stabilizing comprising a beam connected to either side of said concrete base so as to form a cavity between said concrete beam, said concrete base, and said concrete barrier, said cavity capable of being filled.

2. The rock catchment barrier of claim 1, wherein said resulting module is connectable to a second module in a plurality of similarly constructed modules to form a series of connected modules, each capable of catching rocks.

3. The rock catchment barrier of claim 1, wherein a front surface of said concrete base is safety-shaped.

4. The rock catchment barrier of claim 1, wherein said post further comprises a two-piece post, said two-piece post comprising a first piece of said post, a second piece of said post, and a means for attaching said two pieces of said post.

5. The rock catchment barrier of claim 4, wherein said means for attaching said two pieces comprises a shock-absorbing first plate attachable to said first piece of said post.

6. The rock catchment barrier of claim 5, wherein said means for attaching said two pieces further comprises a second plate attachable to said second piece of said post.

7. The rock catchment barrier of claim 6, wherein said means for attaching said two pieces further comprises a first and a second bolt.

8. The rock catchment barrier of claim 7, wherein said means for attaching said two pieces further comprises an angle iron.

9. The rock catchment barrier of claim 8, wherein said means for attaching said two pieces further comprises a shear pin.

10. The rock catchment barrier of claim 9, wherein when said shock-absorbing first plate is attached to said first piece of said post and to said second plate by said first bolt, said second plate is attached to said second piece of said post, and said angle iron is attached to said first piece of said post by said shear pin and to said second plate by said second bolt, a shock upon said first piece of said post is absorbed by said shock-absorbing first plate.

11. The rock catchment barrier of claim 10, wherein when said shock is absorbed by said first plate, said shear pin shears and said first plate bends.

12. The rock catchment barrier of claim 11, wherein said shock-absorbing first plate is attached to said first piece of said post by welding.

13. The rock catchment barrier of claim 12, wherein said second plate is attached to said second piece of said post by welding.

14. The rock catchment barrier of claim 1, wherein a front surface of said concrete barrier is safety-shaped.

15. The rock catchment barrier of claim 1, wherein said means for connecting said post to said top surface of said concrete base comprises an aperture in said top surface.

16. The rock catchment barrier of claim 15, wherein said aperture is located toward a rear of said top surface.

17. The rock catchment barrier of claim 15, wherein said means for connecting said post to said top surface of said concrete base further comprises a metal sleeve insertable into said aperture.

18. The rock catchment barrier of claim 1, wherein said means for connecting said concrete barrier to either side of said concrete base comprises a groove located within either side of said concrete base.

19. The rock catchment barrier of claim 18, wherein said means for connecting said concrete barrier to either side of said concrete base further comprises a groove in said concrete barrier.

20. The rock catchment barrier of claim 19, wherein said means for connecting said concrete barrier to either side of said concrete base further comprises an H-key having flanges insertable within said grooves.

21. The rock catchment barrier of claim 1, wherein said means for catching rocks comprises a cable mesh fence.

22. The rock catchment barrier of claim 21, wherein said means for catching rocks further comprises a chain link fence attachable over said cable mesh fence.

23. The rock catchment barrier of claim 21, wherein said cable mesh fence comprises a perimeter cable.

24. The rock catchment barrier of claim 23, wherein said cable mesh fence further comprises interior cable weavable around said perimeter cable.

25. The rock catchment barrier of claim 24, wherein said interior cable is diagonally woven.

26. The rock catchment barrier of claim 21, wherein said means for catching rocks further comprises a supporting cable attachable to said cable mesh fence.

27. The rock catchment barrier of claim 1 further comprising shackles for attaching said means for catching rocks to said post.

28. The rock catchment barrier of claim 1, wherein said means for connecting said concrete beam to either side of said concrete base comprises a notch in either side of said concrete base of a shape which allows said beam to be inserted therein.

29. The rock catchment barrier of claim 28, wherein said notch is L-shaped and a cross-section of said beam is L-shaped.

30. The rock catchment barrier of claim 28, wherein said notch is located toward said concrete base.

31. The rock catchment barrier of claim 28, wherein said notch is further located in said concrete base.

32. The rock catchment barrier of claim 1, wherein said concrete base has apertures substantially vertically therethrough for anchoring said concrete base to earth by means of stakes.

33. The rock catchment barrier of claim 1, wherein said concrete barrier has apertures substantially vertically therethrough for anchoring said concrete barrier to earth by means of stakes.

34. The rock catchment barrier of claim 1, wherein said concrete beam has apertures substantially vertically therethrough for anchoring said concrete beam to earth by means of stakes.

35. The rock catchment barrier of claim 1 further comprising fill within said cavity.

36. A two piece post useable in a rock catchment barrier, said two-piece post comprising a first piece of said post, a second piece of said post, and a means for attaching said two pieces of said post,
wherein said means for attaching said two pieces comprises a shock-absorbing first plate attachable to said first piece of said post, a second plate attachable to said second piece of said post, a first and a second bolt, an angle iron, and a shear pin,
wherein when said shock-absorbing first plate is attached to said first piece of said post and to said second plate by said first bolt, said second plate is attached to said second piece of said post, and said angle iron is attached to said first piece of said post by said shear pin and to said second plate by said second bolt, a shock upon said first piece of said post is absorbed by said shock-absorbing first plate.

37. A rock catchment barrier comprising a plurality of modules, each said module comprising:
   a concrete base having a top surface;
   a post;
   a concrete barrier;
   a means for connecting said post to said top surface of said concrete base;
   a means for connecting said concrete barrier to either side of said concrete base, said means comprising a groove located within either side of said concrete base, a groove in said concrete barrier, and an H-key having flanges insertable within said grooves; and
   a means when said concrete base is connected to said concrete barrier, and said post is connected to said concrete base and said means for catching rocks, a resulting module is formed.

* * * * *

UNITED STATES PATENT AND TRADEMARK OFFICE
CERTIFICATE OF CORRECTION

PATENT NO. : 5,186,438

DATED : February 16, 1993

INVENTOR(S) : Richard H. Cross and Peter J. Smith

It is certified that error appears in the above-identified patent and that said Letters Patent is hereby corrected as shown below:

Col. 14, claim 30, line 2, after "located toward" add --a rear surface of--

Col. 14, claim 31, line 2, after "located in" add --a top surface of--

Col. 14, claim 36, line 1, change "two piece" to --two-piece--

Col. 16, claim 37, line 14, after "a means" and before "when said" insert:

--for catching rocks, said means attachable to said post;
    wherein--.

Signed and Sealed this

Eighteenth Day of January, 1994

Attest:

BRUCE LEHMAN

*Attesting Officer*   *Commissioner of Patents and Trademarks*